(12) United States Patent
Ladwig et al.

(10) Patent No.: US 7,574,050 B2
(45) Date of Patent: Aug. 11, 2009

(54) IMAGE PAGE SEARCH FOR ARBITRARY TEXTUAL INFORMATION

(75) Inventors: Michael Ladwig, Reston, VA (US);
Bruce W. Stalcup, Springfield, VA (US);
James Brower, Ashburn, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 837 days.

(21) Appl. No.: 10/795,976

(22) Filed: Mar. 10, 2004

(65) Prior Publication Data

US 2004/0170328 A1    Sep. 2, 2004

Related U.S. Application Data

(63) Continuation-in-part of application No. 09/126,818, filed on Jul. 31, 1998, now Pat. No. 6,741,743.

(51) Int. Cl.
  *G06K 9/62* (2006.01)
(52) U.S. Cl. .................................... 382/209; 382/280
(58) Field of Classification Search ......... 382/217–223, 382/209
See application file for complete search history.

(56) References Cited

U.S. PATENT DOCUMENTS

| | | | |
|---|---|---|---|
| 3,846,752 A * | 11/1974 | Nakano et al. ............... | 382/206 |
| 3,851,308 A | 11/1974 | Kawasaki et al. | |
| 4,809,340 A | 2/1989 | Mersereau | |
| 4,955,060 A | 9/1990 | Katsuki et al. | |
| 4,989,082 A | 1/1991 | Hopkins | |
| 5,159,646 A | 10/1992 | Kumagai | |
| 5,311,359 A | 5/1994 | Lucas et al. | |
| 5,317,646 A | 5/1994 | Snag, Jr. et al. | |
| 5,321,773 A * | 6/1994 | Kopec et al. ................ | 382/209 |
| 5,394,487 A | 2/1995 | Burger et al. | |
| 5,404,411 A * | 4/1995 | Banton et al. ............... | 382/254 |
| 5,530,775 A * | 6/1996 | Avi-Itzhak .................. | 382/209 |
| 5,568,568 A * | 10/1996 | Takizawa et al. ............ | 382/220 |
| 5,583,950 A * | 12/1996 | Prokoski ..................... | 382/212 |

(Continued)

FOREIGN PATENT DOCUMENTS

WO    WO 00/10118    *  2/2000

OTHER PUBLICATIONS

Chalana V., et al., "Duplicate Document Detection in DocBrowse", Proceedings of the SPIE, vol. 3305, Jan. 1998, pp. 169-178.

(Continued)

*Primary Examiner*—Matthew C. Bella
*Assistant Examiner*—Sath V. Perungavoor
(74) *Attorney, Agent, or Firm*—Lowe Hauptman Ham & Berner, LLP

(57) ABSTRACT

The approach of the present invention is called optical word recognition (OWR). The present invention advantageously uses techniques to search for arbitrary textual information contained in imaged documents. The result is a significant advance in high-speed search for textual information within imaged documents. The optical apparatus includes a generating unit for synthetically generating textual patterns as signal templates. The optical apparatus has a compensating unit for compensating, if necessary, for visual differences between the synthetically generated textual patterns and images being compared against the synthetically generated images. The optical apparatus has a comparing unit for comparing compensated images against images in a database.

16 Claims, 2 Drawing Sheets

U.S. PATENT DOCUMENTS

| | | | |
|---|---|---|---|
| 5,619,596 A * | 4/1997 | Iwaki et al. | 382/278 |
| 5,668,897 A | 9/1997 | Stolfo | |
| 5,671,282 A | 9/1997 | Wolff et al. | |
| 5,719,959 A * | 2/1998 | Krtolica | 382/209 |
| 5,745,600 A * | 4/1998 | Chen et al. | 382/218 |
| 5,764,809 A * | 6/1998 | Nomami et al. | 382/284 |
| 5,844,991 A | 12/1998 | Hochberg et al. | |
| 5,854,854 A | 12/1998 | Cullen et al. | |
| 5,883,986 A * | 3/1999 | Kopec et al. | 382/310 |
| 5,912,982 A | 6/1999 | Munro et al. | |
| 5,915,034 A * | 6/1999 | Nakajima et al. | 382/124 |
| 5,960,112 A | 9/1999 | Lin et al. | |
| 6,002,807 A * | 12/1999 | Guerci | 382/278 |
| 6,023,528 A | 2/2000 | Froessl | |
| 6,285,802 B1 * | 9/2001 | Dennis et al. | 382/280 |
| 6,351,660 B1 * | 2/2002 | Burke et al. | 600/425 |
| 6,470,092 B1 * | 10/2002 | Li et al. | 382/132 |
| 6,549,683 B1 * | 4/2003 | Bergeron et al. | 382/298 |
| 6,741,743 B2 * | 5/2004 | Stalcup et al. | 382/217 |
| 7,227,996 B2 * | 6/2007 | Imagawa et al. | 382/199 |
| 2002/0113801 A1 * | 8/2002 | Reavy et al. | 345/589 |
| 2003/0081813 A1 * | 5/2003 | Astle | 382/103 |
| 2004/0190773 A1 * | 9/2004 | Messer et al. | 382/182 |
| 2004/0218815 A1 * | 11/2004 | Iizuka | 382/209 |

OTHER PUBLICATIONS

Cesarini F., et al., "INFORMYS: A Flexible Invoice-Like Form-Reader System", IEEE Transactions on Pattern Analysis and Machine Intelligence, IEEE, vol. 20, No. 7, pp. 730-745, Jul. 1, 1998.

Levin, D., et al., "Application of the Discrete Wavelet Transform to Identification of Questioned Documents", Proceedings of the IEEE, Oct. 1994, pp. 318-321.

Bruce W. Stalcup, "Indexing Multimedia Databases with Wavelet Packets", Litton/PRC Center for Aplied Technology, Mar./Apr. 1997.

Dr. Chen Hwa, Wavelet—A New Enabling Technology for Multimedia DBMS Applications, Litton Applied Technology, Jan./Feb. 1997.

David Casasent, "General-Purpose Optical Pattern Recognition Image Processors", IEEE, vol. 82, No. 11, Nov. 1994, pp. 1724-1734.

\* cited by examiner

IMAGE PAGE SEARCH FOR ARBITRARY TEXTUAL INFORMATION

RELATED APPLICATION

This application is a continuation-in-part application of Ser. No. 09/126,818 filed Jul. 31, 1998 now U.S. Pat. No. 6,741,743.

FIELD OF THE INVENTION

The present invention relates generally to imaged document searching, and more specifically, to an imaged document search that uses optical correlation methods and techniques to search for arbitrary textual information contained in imaged documents. The result is a significant advance in high-speed search for textual information within imaged documents.

BACKGROUND OF THE INVENTION

Numerous organizations must review and extract information from large repositories of imaged documents. Document images may contain information in a variety of languages and can be printed or handwritten. These document images are not able to be directly searched using typical information retrieval techniques because the contents are represented as pixel collections instead of computer language characters.

Organizations attempting to exploit information from image document pages are the very last link in a complex chain of circumstances that effect the quality of the pixel collections that the organization is attempting to manipulate.

First, the page producer selects a typeface and size (e.g. Times 14) for use in imaging the textual information, producing a particular visual appearance. Next, the page producer selects a particular hardware device (e.g. Epson 940 inkjet printer) to produce the paper copy; different printers will affect the visual representation significantly. After production, the page may be subjected to a variety of processes that may alter the visual representation of the page. The page may be copied using copier devices that introduce distortions or other visual artifacts. The page may be subjected to environmental insults such as being crumpled or obscured with dirt or liquid. Finally, when the page is to be scanned into the database that the system will be using for search operations, the visual representation of the page image will be influenced by the quality and characteristics of the scanner used as well as the quality of the scanning technique employed.

Most approaches to the problem of searching imaged documents start with an initial step of converting written content from an image format to electronic text. Traditional solutions are based on optical character recognition (OCR) techniques, which have numerous problems. First, as discussed above, document images may be in less than ideal condition. Distortion, rotation, duplication artifacts, or transmission noise may be present and can preclude effective OCR processing. Second, the OCR conversion process can be too slow to cope with required document processing speeds. Third, normal error rates in OCR conversion have a significant negative impact on downstream use of the textual information. Fourth, there are many languages for which there are no OCR conversion engines at all or no engines of acceptable quality.

Because of these problems with existing practices, an approach was needed to search for arbitrary written information contained in imaged documents directly eliminating the OCR process. This approach of the present invention is called optical word recognition (OWR). The present invention advantageously uses techniques to search for arbitrary textual information contained in imaged documents. The result is a significant advance in high-speed search for textual information within imaged documents. The present invention can be used, for example, in language identification, signature identification and signature detection. It is especially useful in searching for the images in large databases.

SUMMARY OF THE INVENTION

It is therefore an object of the present invention to provide a method of automatically identifying a pattern on a page including synthetically generating textual patterns as signal templates and compensating, if necessary, for visual differences between the synthetically generated textual patterns and images compared against the synthetically generated images and compared to compensated images against images in a database.

Another object of the present invention is achieved by a computer software product configured to automatically identify a pattern on a page that includes the computer software product including a medium readable by a processor. The medium has stored a first sequence of instructions, when executed by the processor, causes the processor to synthetically generate textual patterns as signal templates. A second sequence of instructions when executed by the processor causes the processor to compensate, if necessary, for visual differences between the synthetically generated textual patterns and images being compared against the synthetically generated images. A third set of instructions, when executed by the processor, causes the processor to compare compensated images against images in a database.

These and other objects of the present invention are achieved by an optical apparatus configured to automatically identify a pattern on a page. The optical apparatus includes a generating unit for synthetically generating textual patterns as signal templates. The optical apparatus has a compensating unit for compensating, if necessary, for visual differences between the synthetically generated textual patterns and images being compared against the synthetically generated images. The optical apparatus has a comparing unit for comparing compensated images against images in a database.

The foregoing and other objects of the present invention are achieved by a computer-readable medium configured to automatically identify a pattern on page. The computer-readable medium has stored a plurality of sequences of instructions, the plurality of sequences of instructions which, when executed by a processor, causes the processor to perform. The computer-readable medium synthetically generates textual patterns as signal templates. The computer-readable medium compensates, if necessary, for visual differences between the synthetically generated textual patterns and images being compared against the synthetically generated images. The computer-readable medium compares compensated images against images in a database.

The foregoing and other objects of the present invention are achieved by a computer system for automatically identifying a pattern on a page. The computer system is comprised of a processor and a memory coupled to the processor. The memory has stored sequences of instructions which, when executed by the processor, synthetically generates textual patterns as signal templates. The computer system compensates, if necessary, for visual differences between the synthetically generated textual patterns and images being compared against the synthetically generated images. The computer system compares compensated images against images in a database.

Still other objects and advantages of the present invention will become readily apparent to those skilled in the art from the following detailed description, wherein the preferred embodiments of the invention are shown and described, simply by way of illustration of the best mode contemplated by carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
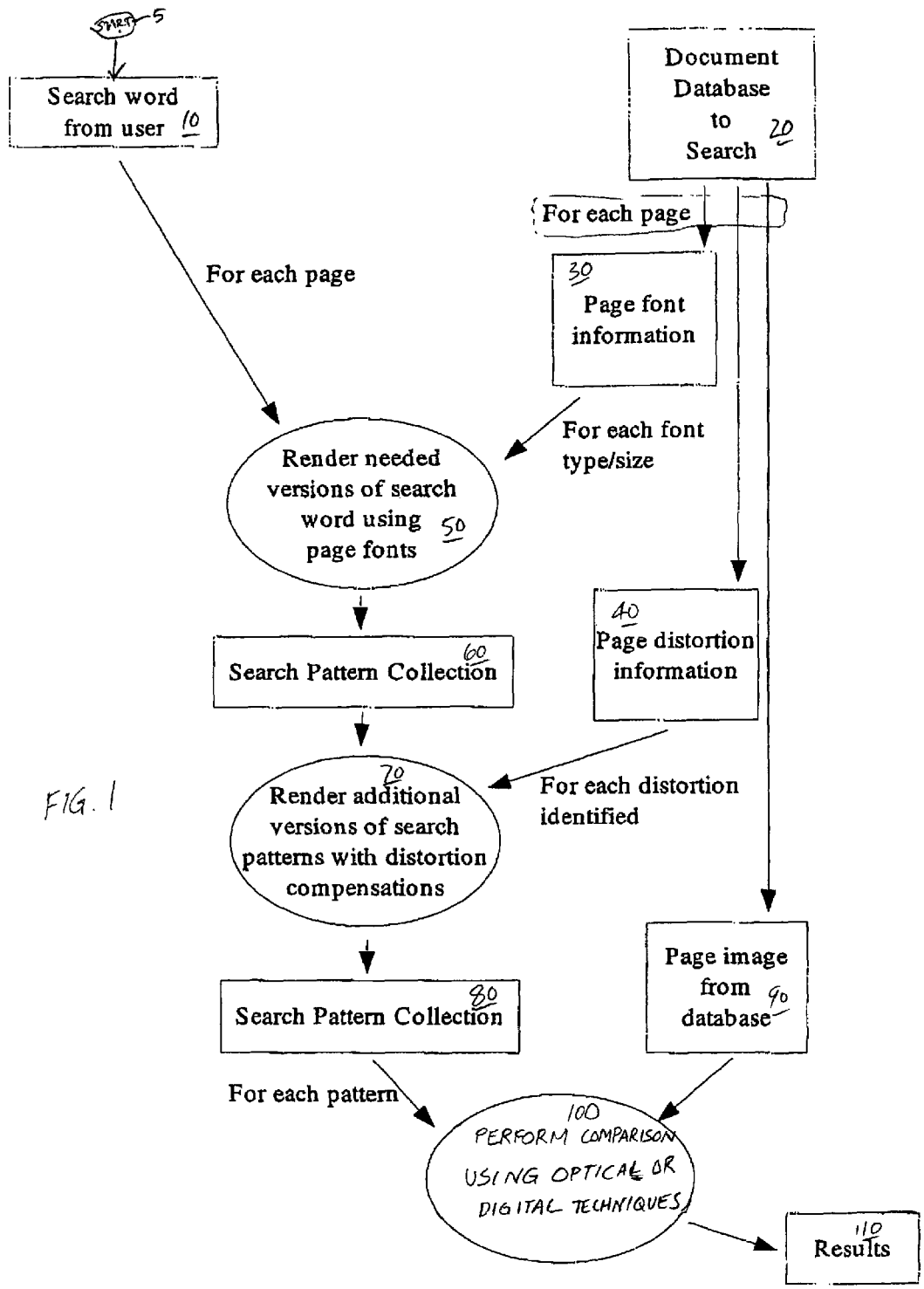
FIG. 1 is a flow chart of a method of synthetically generating textual patterns according to the present invention.

A method and apparatus of using optical word recognition is described. In the following description, for purposes of explanation, numerous specific details are set forth in order to provide for a thorough understanding of the present invention. It will be apparently, however, that the present invention may be practiced without these specific details. In other instances, well-known structures and devices are shown in block diagram form in order to avoid unnecessarily obscuring the present invention.

As explained in application Ser. No. 09/126,818 filed Jul. 31, 1998, entitled "Imaged Document Optical Correlation and Conversion System" (hereinafter called "the '818 application"), signal templates are generated by selecting a portion of the image. As discussed in this application, the signal templates used to search documents are synthetically generated, allowing searches to be independent of the: a) font type and font size used in a given page being searched; b) characteristics of the printer used to produce the page; c) page image quality due to degradation of the original, d) page image quality due to poor quality scanning, e) operator's ability to find an exemplar of the desired search term in an existing page. These signal templates are compared using a type of comparison performed using optical or digital techniques (as discussed below).

This difference removes the transition costs (in terms of processing time) from digital representation to optical representation for the correlation. The present invention also allows the search process to be performed using inexpensive general purpose computing systems rather than expensive optical correlation equipment. The present invention further allows individual calculations in the search operations to be distributed and performed in parallel using general purpose cluster computing systems.

In the present invention, two pages identified as duplicates are assessed for quality and the lower quality page deleted, as opposed to the '818 application, where duplicate documents are simply deleted.

The '818 application refers to the selection of a pattern from a document page for use as a signal template. This is an ingenious, but flawed way to eliminate very complex parts of the search process. By using a pattern selected from a pre-existing document, one does not have to compensate for the factors discussed in the page production paragraph in the Background section. Unfortunately, this places severe limits on the ability of the invention discussed in the '818 application to successfully search for patterns that differ in any way from the pattern selected from the pre-existing document. Obviously, many pages being searched will differ in how they were composed, printed, handled and scanned.

The present invention takes an alternative path, synthetically generating textual patterns for use as signal templates in order to produce a compensation process necessary to accommodate the crucial visual representation differences between different font typefaces, different font sizes, as well as distortions introduced in the subsequent printing, handling and/or scanning of the page.

The flow of this target generation and search process is as depicted in FIG. 1 starting at step 5. The process starts at step 10 with a search word from the user specified using a numeric representation of the characters in the search word using Unicode (allowing search terms in any written language). At step 20, a database of pages is used to search for the word. Step 10 is performed for each page searched.

Advantageously, the synthetic generation process makes use of information (page metadata) automatically developed for the page at the time it was initially added to the page database. At step 30, the page metadata is used to decide which font typefaces and font size combinations are necessary to represent the fonts known to be present on the page. Thus, one search word may produce several search patterns; for example, the word in Times/12, Times/10 and Arial/18. Step 20 is performed for each page searched. At step 40, page distortion information is identified for each page and is provided to step 70 as discussed below. At step 50, the needed versions of search words using page fonts are rendered using page metadata 30 and search words from the user 10. At step 60, pattern collections are searched using rendered versions from step 50. At step 70, the page metadata is also used to compensate for distortions (if any was found) of the page through the printing, handling and scanning process. The compensations may include small enlargements or reductions in search pattern size, visual distortions such as rounding off of fine details, or other necessary modifications. Thus, each of the search patterns developed in the previous processing step 60 may be modified (or modified versions added to the pattern collection) producing a final collection of search patterns at step 80. At step 100, additional revisions of search patterns with distortion compensations are rendered and the results are produced at step 110. Then the entire above process (steps 10-100) is repeated for the next page to be searched.

There are numerous variations on this basic process, all involving optimizations such as generating all font type/size combinations of the search term in advance, but regardless of these techniques, the basic process (if not the sequential order) will remain essentially the same.

With respect to comparison steps 70 and 100 in FIG. 1, other correlation methods, such as digital techniques, can be used than the method described in the '818 application. A more general form of image comparison can be performed using techniques other than optically-based correlation. This comparison technique could be considered to achieve ends equivalent to optical correlation but through different means.

Figure 2:
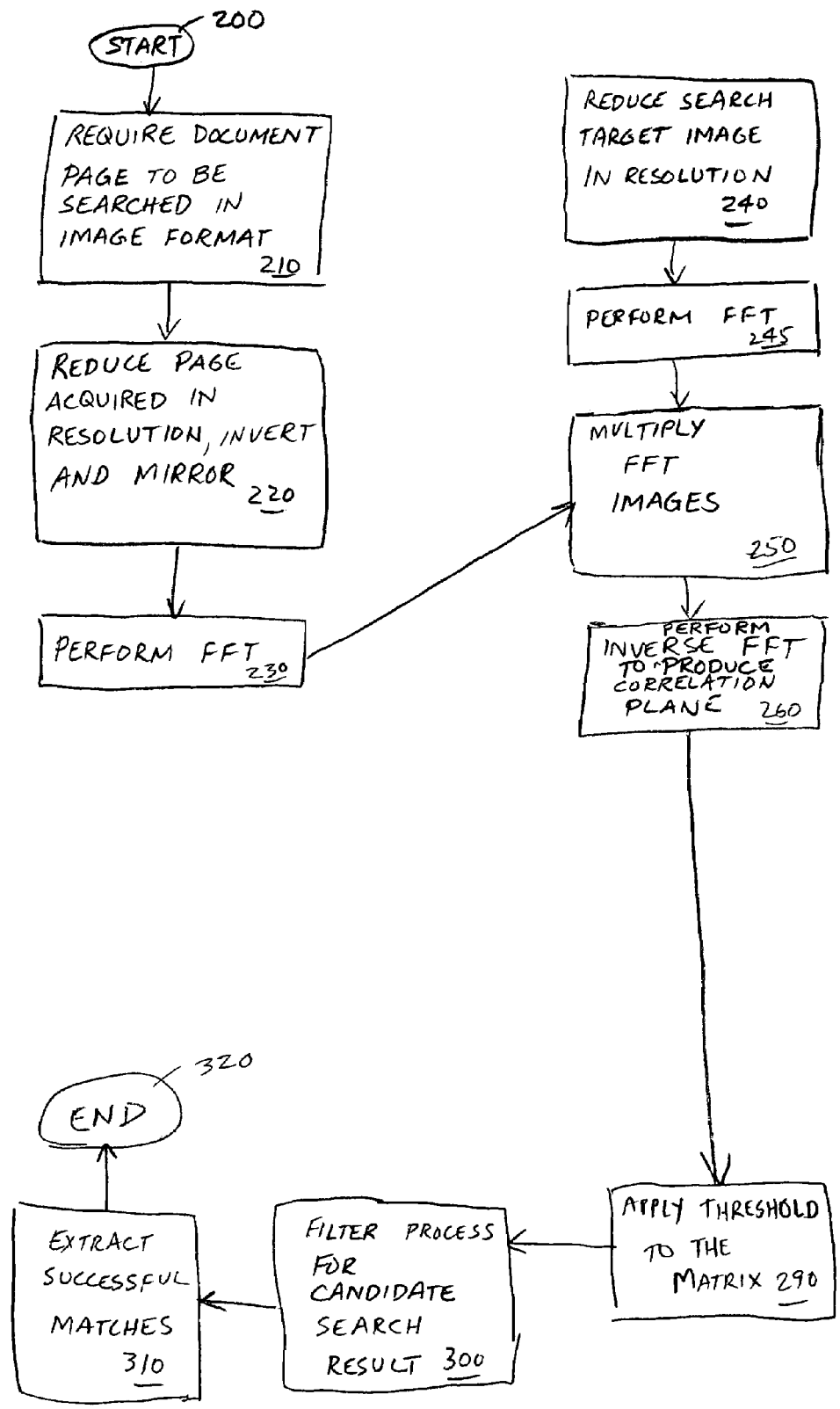
FIG. 2 is a flow chart of an image comparison technique according to the present invention.

The core of the comparison approach according to the present invention is the following algorithm as illustrated in FIG. 2. The process is started at step 200. At step 210, the document page to be searched is acquired in an image format. At step 220, the page image is reduced in resolution, inverted and mirrored. A two-dimensional Fast Fourier Transform (FFT) moving this representation from the spatial to frequency domain is performed at step 230. The search target image (a document, word or other image) is reduced in resolution at step 240 and then an FFT is performed at step 245. The FFT images of the document and the target are multiplied at step 250 to produce a correlation plane and an inverse FFT is performed at step 260 to take it from the frequency spectrum to the spatial specification to produce a similarity matrix for the search pattern locations within the document image. A threshold is then applied to the matrix, and the locations of matches above the threshold are extracted at step 290.

Next, to increase accuracy, these candidate matches are processed through additional comparison processes, but instead of using the entire page image as a comparison element, only the segment of the page image corresponding to the candidate search result is used. This filtering process may use multiple algorithms at step 290. In the current invention, the key discriminating filter used is a spatial domain comparison technique called void space filtering. In this technique, an inverse connected element analysis technique discovers large blocks of white space surrounding the image to produce a "fingerprint" of the white space in an image. Such fingerprints can be created and compared very quickly, and are thus well suited to this application.

An addition to avoid space filtering, second stage comparison algorithms similar to the FFT based technique above, differing in that resolution reduction is not performed, can also be used. After all filters have been applied to the comparisons, successful matches are extracted as the search results at step 310. The process ends at step 320.

In the current invention, two pages identified as duplicates are assessed for quality and the lower quality page deleted. Quality assessment is accomplished by performing a connected element analysis to identify "speckle" (indicating degradation in the handling or scanning processes) as well as blocks of solid color (indicating portions of fully saturated text such as would appear in redact or obscured text). Other methods for quality assessment are possible.

It should now be apparent that a method has been described in which images can be searched from a database and the optical correlation has been eliminated. Advantageously, the inventive method compensates for distortions caused by printing, handling or a scanning process.

It is readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited by the definition contained in the appended claims and equivalents thereof.

What is claimed is:

1. A method of automatically identifying a pattern on a page, comprising:
    a computer performing the following:
    synthetically generating textual patterns as signal templates;
    generating a compensated image, compensating, if necessary, for visual differences between the synthetically generated textual patterns and images being compared against the synthetically generated patterns; and comparing compensated images against images in a database; and
    identifying a pattern on a page based upon the comparison;
    wherein compensating an image includes reducing resolution, inverting and mirroring a page image in the database; and
    wherein comparing compensated images against images in a database includes:
        performing a Fast Fourier Transform (FFT) on the compensated image, moving the compensated image from the spatial to frequency domain;
        performing an FFT on a search target image;
        multiplying the FFT on the image to be searched by the FFT of the search target image to produce a correlation plane;
        performing an inverse FFT of the correlation plane, converting the correlation plane from the frequency domain to a spatial specification to produce a similarity matrix for search pattern locations within the target image; and
        applying a threshold to the similarity matrix to extract location of matches above the threshold.

2. The method of claim 1, comprising outputting a signal against a synthetically generated image.

3. The method of claim 1, wherein said compensating step accommodates for visual differences between font typefaces and different font sizes.

4. The method of claim 1, further comprising deleting a duplicate scanned first page.

5. The method of claim 1, further comprising identifying pages as duplicates and assessing the duplicates for quality and deleting lower quality page of the duplicates.

6. The method of claim 5, comprising performing a connected element analysis to identify speckle and blocks of solid color.

7. The method of claim 1, wherein said compensating step can accommodate visual differences between different typefaces, different font sizes and distortions introduced in subsequent printing, handling and/or scanning of the page.

8. The method of claim 1, wherein said compensating step can accommodate visual differences occurring from producing a graphic image.

9. The method of claim 1, comprising creating a database of metadata to use in synthetically generating patterns.

10. The method of claim 1, comprising creating a target to search for using a search word specified using numeric characters in the search word.

11. The method of claim 10, wherein compensations include small enlargements or reductions in search pattern size or visual distortions.

12. A computer readable medium, comprising:
    a first sequence of instructions which, when executed by said processor, causes said processor to:
    synthetically generate textual patterns as signal templates;
    a second sequence of instructions which when executed by said processor, causes said processor to compensate, if necessary, for visual differences between the synthetically generated textual patterns and images being compared against the synthetically generated images; and
    a third set of instructions, which when executed by said processor, causes said processor to compare compensated images against images in a database;
    wherein compensating includes reducing resolution, inverting and mirroring a page image in the database; and
    wherein comparing compensated images against images in a database includes:
        performing a Fast Fourier Transform (FFT) on the compensated image, moving the compensated image from the spatial to frequency domain;
        performing an FFT on a search target image;

multiplying the FFT of the image to be searched by the FFT of the search target image to produce a correlation plane;

performing an inverse FFT of the correlation plane, converting the correlation plane from the frequency domain to a spatial specification to produce a similarity matrix for search pattern location within the target image; and applying a threshold to the similarity matrix to extract location of matches above the threshold.

13. An optical apparatus, configured to automatically identify a pattern on a page, comprising:

a generating unit for synthetically generating textual patterns as signal templates;

a compensating unit for compensating, if necessary, for visual differences between the synthetically generated textual patterns and images being compared against the synthetically generated images; and a comparing unit for comparing compensated images against images in a database wherein compensating includes reducing resolution, inverting and mirroring a page image in the database; and wherein comparing compensated images against images in a database includes:

performing a Fast Fourier Transform (FFT) on the compensated image, moving the compensated image from the spatial to frequency domain;

performing an FFT on a search target image;

multiplying the FFT of the image to be searched by the FFT of the search target image to produce a correlation plane;

performing an inverse FFT of the correlation plane, converting the correlation plane from the frequency domain to a spatial specification to produce a similarity matrix for search pattern locations within the target image; and applying a threshold to the similarity matrix to extract location of matches above the threshold.

14. A computer-readable medium configured to automatically identify a pattern on a page, having stored thereon a plurality of sequences of instructions, said plurality of sequences of instructions which, when executed by a processor, cause said processor to perform the steps of:

synthetically generating textual patterns as signal templates;

compensating, if necessary, for visual differences between the synthetically generated textual patterns and images being compared against the synthetically generated images; and comparing compensated images against images in a database;

wherein compensating includes reducing resolution, inverting and mirroring a page image in the database; and wherein comparing compensated images against images in a database includes:

performing a Fast Fourier Transform (FFT) on the compensated image, moving the compensated image from the spatial to frequency domain;

performing an FFT on a search target image;

multiplying the FFT of the image to be searched by the FFT of the search target image to produce a correlation plane;

performing an inverse FFT of the correlation plane, converting the correlation plane from the frequency domain to a spatial specification to produce a similarity matrix for search pattern locations within the target image; and applying a threshold to the similarity matrix to extract location of matches above the threshold.

15. A computer system for automatically identifying a pattern on a page, said computer system comprising a processor and a memory coupled to said processor; the memory having stored therein sequences of instructions, which, when executed by said processor to perform the steps of:

synthetically generating textual patterns as signal templates;

compensating, if necessary, for visual differences between the synthetically generated textual patterns and images being compared against the synthetically generated images; and comparing compensated images against images in a database;

wherein compensating includes reducing resolution, inverting and mirroring a page image in the database; and wherein comparing compensated images against images in a database includes:

performing a Fast Fourier Transform (FFT) on the compensated image, moving the compensated image from the spatial to frequency domain;

performing an FFT on a search target image;

multiplying the FFT of the image to be searched by the FFT of the search target image to produce a correlation plane;

performing an inverse FFT of the correlation plane, converting the correlation plane from the frequency domain to a spatial specification to produce a similarity matrix for search pattern locations within the target image; and applying a threshold to the similarity matrix to extract location of matches above the threshold.

16. A method of automatically identifying a pattern on a page, comprising:

a computer performing the following:

synthetically generating textual patterns as signal templates;

generating a compensated image, compensating, if necessary, for visual differences between the synthetically generated textual patterns and image being compared against the synthetically generated images; and comparing compensated images against images in a database;

wherein said compensating includes reducing resolution, inverting and mirroring a page image in the database;

wherein compensating includes reducing resolution, inverting and mirroring a page image in the database; and wherein comparing compensated images against images in a database includes:

performing a Fast Fourier Transform (FFT) on the compensated image, moving the compensated image from the spatial to frequency domain;

performing an FFT on a search target image;

multiplying the FFT of the image to be searched by the FFT of the search target image to produce a correlation plane;

performing an inverse FFT of the correlation plane, converting the correlation plane from the frequency domain to a spatial specification to produce a similarity matrix for search pattern location within the target image; and applying a threshold to the similarity matrix to extract location of matches above the threshold.

* * * * *